(12) United States Patent
Hawthorne

(10) Patent No.: US 7,917,345 B2
(45) Date of Patent: Mar. 29, 2011

(54) MULTIMEDIA TRAIN SIMULATOR

(75) Inventor: Michael J Hawthorne, Watertown, NY (US)

(73) Assignee: New York Air Brake Corporation, Watertown, NY (US)

( * ) Notice: Subject to any disclaimer, the term of this patent is extended or adjusted under 35 U.S.C. 154(b) by 679 days.

(21) Appl. No.: 11/908,330

(22) PCT Filed: Apr. 4, 2006

(86) PCT No.: PCT/US2006/012283
§ 371 (c)(1),
(2), (4) Date: Sep. 11, 2007

(87) PCT Pub. No.: WO2006/110371
PCT Pub. Date: Oct. 19, 2006

(65) Prior Publication Data
US 2009/0125287 A1 May 14, 2009

Related U.S. Application Data

(60) Provisional application No. 60/668,997, filed on Apr. 7, 2005.

(51) Int. Cl.
*G06F 9/455* (2006.01)
(52) U.S. Cl. .............. 703/8; 701/20; 434/29; 246/3
(58) Field of Classification Search .......... 703/1, 6, 703/8, 7; 701/19, 20, 107; 705/8; 700/302, 700/30; 434/29; 463/6; 246/3, 1, 100; 472/60
See application file for complete search history.

(56) References Cited

U.S. PATENT DOCUMENTS

| | | | |
|---|---|---|---|
| 4,041,283 A * | 8/1977 | Mosier | 701/20 |
| 4,042,810 A | 8/1977 | Mosher | |
| 4,236,215 A | 11/1980 | Callahan et al. | |
| 4,561,057 A | 12/1985 | Haley et al. | |
| 4,794,548 A | 12/1988 | Lynch et al. | |
| 4,827,438 A | 5/1989 | Nickles et al. | |
| 4,843,883 A | 7/1989 | Glover et al. | |
| 6,144,901 A | 11/2000 | Nickles et al. | |
| 6,332,106 B1 | 12/2001 | Hawthorne et al. | |
| 6,748,303 B2 | 6/2004 | Hawthorne | |
| 2001/0029411 A1 * | 10/2001 | Hawthorne | 701/19 |
| 2002/0068641 A1 * | 6/2002 | Dicicco | 472/60 |
| 2002/0183995 A1 * | 12/2002 | Veitch et al. | 703/7 |
| 2003/0109296 A1 * | 6/2003 | Leach et al. | 463/6 |
| 2003/0236654 A1 * | 12/2003 | Flynn et al. | 703/8 |
| 2004/0030538 A1 | 2/2004 | Hawthorne et al. | |
| 2004/0059442 A1 * | 3/2004 | Birkelbach et al. | 700/30 |
| 2004/0093196 A1 * | 5/2004 | Hawthorne et al. | 703/8 |
| 2004/0102878 A1 * | 5/2004 | Hawthorne | 701/19 |
| 2004/0111309 A1 * | 6/2004 | Matheson et al. | 705/8 |
| 2004/0133315 A1 * | 7/2004 | Kumar et al. | 700/302 |

(Continued)

OTHER PUBLICATIONS

Shaw, E et al. "Pedagogical Agents on the Web." Proc. of the 3rd Annual Conf. on Autonomous Agents. 199. pp. 283-290. Johnson, W.L. et al. "Evolution of User Interaction: The Case of Agent Adele." Proc. of the 8th Int'l. Conf. on Intelligent User Interfaces. 2003. pp. 93-100.

*Primary Examiner* — Kandasamy Thangavelu
(74) *Attorney, Agent, or Firm* — Barnes & Thornburg LLP

(57) ABSTRACT

A train simulator, including a microprocessor, a display and an input device for the microprocessor. A program drives the display with the track data during simulation, determines if an exception has occurred during the simulation; and provides a multimedia message if an exception has occurred.

14 Claims, 2 Drawing Sheets

U.S. PATENT DOCUMENTS

| | | | |
|---|---|---|---|
| 2004/0138789 A1* | 7/2004 | Hawthorne | 701/19 |
| 2004/0238693 A1* | 12/2004 | Cole | 246/3 |
| 2005/0119804 A1* | 6/2005 | Hawthorne | 701/19 |
| 2005/0228620 A1* | 10/2005 | Convert et al. | 703/1 |
| 2005/0234757 A1* | 10/2005 | Matheson et al. | 705/8 |
| 2005/0282137 A1 | 12/2005 | Sasinowski et al. | |
| 2006/0074544 A1* | 4/2006 | Morariu et al. | 701/117 |
| 2006/0226298 A1* | 10/2006 | Pierson | 246/1 R |
| 2006/0252012 A1* | 11/2006 | Hawthorne et al. | 434/29 |

\* cited by examiner

MULTIMEDIA TRAIN SIMULATOR

CROSS REFERENCE

This application claims benefit of and incorporates herein by reference U.S. Provisional Patent Application Ser. No. 60/668,997 filed Apr. 7, 2005.

BACKGROUND AND SUMMARY OF THE INVENTION

The present invention relates generally to train locomotive simulators and playback stations and more specifically to improvements thereto.

Simulators and playback stations, for example, the Train Dynamics Analyzer (TDA), a long standing Locomotive Engineer training tool offered by the Train Dynamics Services Group of New York Air Brake Corporation, have been used to train engineers. The TDA functionality was enhanced to assist in training Locomotive Engineers on how to better handle their trains. Designs of simulators with math models are shown in U.S. Pat. Nos. 4,041,283, 4,827,438 and 4,853,883. Further capability was added to investigate accidents by playing back the event recorder data through the TDA, monitoring critical physical parameters. Through the years, data was collected from instrumented trains and laboratory experiments, allowing the models used by the TDA to be refined. On board data collection for off-loading is shown in U.S. Pat. Nos. 4,561,057 and 4,794,548.

As more Locomotive Engineers became familiar with the TDA display through training sessions, it became apparent that a real-time version of the TDA in the cab of a locomotive would offer substantial benefits in improved train handling. Earlier designs for on board computer controllers are shown in U.S. Pat. No. 4,042,810 with a description of math models. A Locomotive Engineer Assist Display and Event Recorder (LEADER) system, as described in U.S. Pat. No. 6,144,901, is a real-time, enhanced version of the Train Dynamics Analyzer (TDA).

The LEADER system has the ability to display a real-time or "live" representation of a train on the current track, the trackage ahead, the dynamic interaction of the cars and locomotives (both head end and remote), and the current state of the pneumatic brake system. As a tool for the Locomotive Engineer, the LEADER system allows insight into the effect of throttle changes and brake applications throughout the train providing feedback and information to the Locomotive Engineer not currently available. The information offered by the LEADER system provides an opportunity for both safer and more efficient train handling leading to enormous potential economic benefits.

The LEADER system has all the necessary information to predict the future state of the train given a range of future command changes (what if scenarios). With this ability, LEADER can assist the railroads in identifying and implementing a desired operating goal; minimize time to destination, maximize fuel efficiency, minimize in train forces, (etc.) or a weighted combination thereof. LEADER will perform calculations based on the operational goal and the current state of the train to make recommendations to the Locomotive Crew on what operating changes will best achieve these goals.

Displays for train simulators are exemplified by FIG. 5 of U.S. Pat. No. 6,144,901. It includes display of conditions throughout the trains in graphic representation, as well as a display of numerical values. Another type of display, known as a Strip Chart Display, is exemplified by FIG. 5 of U.S. Pat. No. 4,236,215. Both forums provide different kinds of information for different purposes. Although the simulator display of the LEADER system provides forces throughout the train, the Strip Chart provides a historical record in a playback mode of values as a function of time. Also, these systems have either operated in the playback mode or a simulation mode with no crossover.

The TDS-5000 Simulator, available from New York Air Brake Corporation, provides the capability to develop a training scenario based on a schedule of events that present various circumstances or prompts to the student based on triggers. The triggers can be the start of a session, the location of the train, exceeding a defined level of a parameter, etc., each essentially creating an exception. As an exception is recognized, an instructor is provided a set of options that effectively represent consequences. The consequences may include (among others) point deduction on a score, stopping of the simulation due to a "fatal penalty" or pausing the simulation to allow an instructor to intervene and offer instruction to the student.

An improved simulator of the present disclosure detects an exception and has been programmed to pause the session and present a multimedia consequence or instructor message to the student. These may be one or more of sound, video, and text. The presentation may include lectures on applicable topics, text that reflects operating rules, and video clips to reinforce an instructor's message.

The presentation may also include a test which requires the student, acting through the simulator, to demonstrate knowledge or proficiency. The test may take the form of a written test (keyboard-type entry), multiple choice test, a test simulation run, or an audio response. The test simulation run may be preselected as a function of the exception. All interaction with the system is recorded with the electronic record created with the simulation creating a complete, and re-playable file representing the students entire session. The students response may be incorporated into the scoring or grading criteria for the session.

The program halts the simulation on the occurrence of the exception and does not restart until a consequence identified in the multimedia message has been completed. The simulation is restarted at a preselected point in a simulation run as a function of at least one of the exception and the operator response to the multimedia message Other objects, advantages and novel features of the present disclosure will become apparent from the following detailed description when considered in conjunction with the accompanying drawings.

DETAILED DESCRIPTION OF THE PREFERRED EMBODIMENTS

Figure 1:
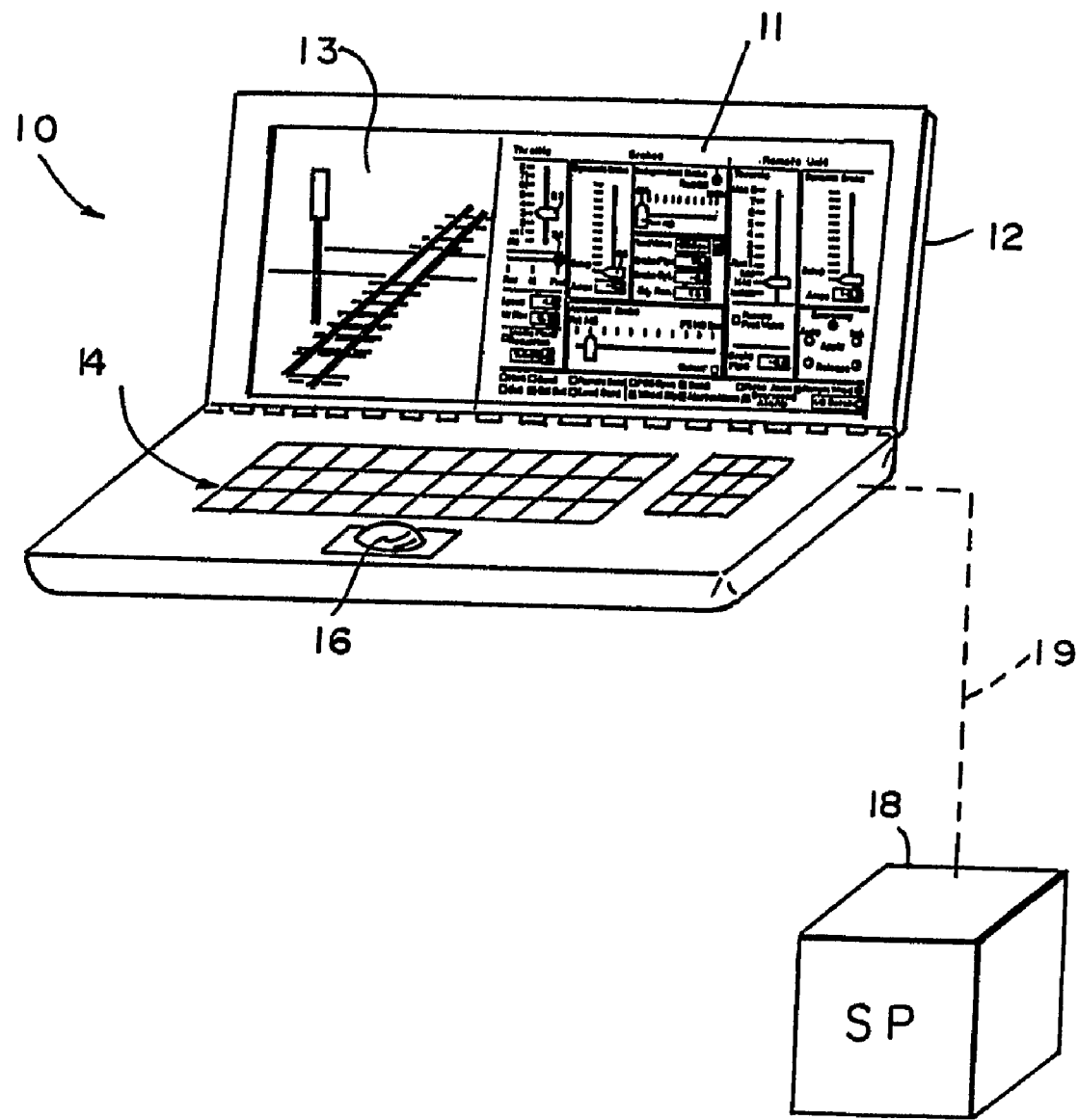
FIG. 1 is a perspective view of a portable simulator and playback station.

Although the present system will be described using a portable simulator and/or playback device 10 illustrated in FIG. 1, it is applicable to any simulator having or programmable to have multimedia presentations. It is illustrated as a portable, personal computer. It includes a microprocessor and an integral display 12. It includes an input device for the microprocessor. The input devices include a keyboard 14, a mouse 16 or the touch screen of display 12. The program for simulation or playback is included in the microprocessor or may lie in a remote microprocessor 18. The portable simulator 10 may be connected to the remote microprocessor 18 by a network 19. The network may be, for example, the internet.

The display 12 may be a split display, as illustrated, with a virtual control stand 11 and a depiction of a track to be traversed 13. Alternatively, the displays 11 and 13 may be full-screen displays with the ability to switch there between. As with many other software-based systems, multiple screens may be displayed side-by-side, staggered or full-screen reduced and restored.

The majority of the depicted indicia and controls are those available on a standard control stand. The position of the indicia for the throttle dynamic brake, independent brake, automatic brake and those elements on the remote unit are controlled by an input device. As previously discussed, this may be the keyboard 14, the mouse 16 or a touch screen control. One or more software programs may be provided to drive the display to depict the various elements of the virtual control stand 11, as well as the changing of the controls in response to control inputs from the input device. Other control devices may also be implemented with the virtual control stand 11. These may include combined throttle and dynamic brake and other distributed power interfaces.

The depiction of the track 13 may be a video of the track or CGI, as illustrated in FIG. 1, which shows a track plus a crossing and a signal light. A second program in the portable simulator 10 has data file of the track and provides it as the train moves along the track. This second program is also responsive to the inputs from the first program or control stand to appropriately progress along the track based upon the stored conditions of the track from the data file, as well as inputs from the throttle and brakes from the control stand 11.

The track view may also be provided in the same software for, and be an alternative to, the graphic or video display of FIG. 1. If the LEADER system is available on the locomotives for that railroad, the LEADER display would be preferable for training purposes. It should also be noted that a full LEADER display, as shown in FIG. 5 of U.S. Pat. No. 6,144,901, may also be provided in the portable simulator 10.

Whereas the control stand display of operating parameters is for the present operating parameter, the display in the track portion 13 is correlated to the track position and represents a history of the operating conditions as the lead locomotive traverses the track. Both may also be displayed. If a standard LEADER-type display is used, the present conditions of the operating parameters would be illustrated as part of the track display 13.

Also, the display may include a strip chart representation of operating parameters. It illustrates the history of the parameter correlated to the location of the track. Even though the strip chart may show the history of a portion of where the train has not reached yet, in a simulator mode it will display only that portion which the train has traversed. In the playback mode, the data file includes the depiction of the track and its correlated operating parameters. The operating parameter display may also be configured to show values ahead of the train if so desired by the user in the playback mode. Reference for these displays is made to FIG. 3 of the US published patent application U.S. 2004-0030538A1 dated Feb. 2, 2004, filed Aug. 4, 2002.

It should be noted that display 13 may be used on any simulator or playback station whether it is portable or not. It may be used with or without a control stand for playback analysis of data collected from a train on a particular run with the operating parameters correlated to the track information.

The operating parameters to be displayed may be selected. These may include, but not be limited to, tractive effort, dynamic brake effort, end of train brake pipe pressure, run in/out (RIO) forces, brake system pressures, lateral over vertical (L/V) force ratio, traction motor current, traction motor voltage, speed, speed limit, acceleration, heading, buff/draft forces, minimum safe brake pipe reduction, actual brake pipe reduction, fuel consumed, horn use, bell use, throttle setting and dynamic brake setting. This system may also automatically identify exceptions, such as overspeed, and highlight these events on the display.

The whole history of a run may be displayed in a playback station and only that which has transpired would be displayed in a simulator. The playback system will allow the operator to select a location by track position in either the strip chart representation or the LEADER system representation and be able to flip back and forth between the two. All presented data would be accurate for each screen with the position of the train in the playback being preserved.

Portable simulator and playback station 10, or any other simulator and playback station, whether portable or not, may also be provided with a program to allow the transition from playback to simulation as described in U.S. published patent application U.S. 2004-0030538A1, which is incorporated herein by reference.

It should be noted that the data file with the correlated operating parameters may be from an actual locomotive, for example, event recorder data, an earlier simulation run or from other sources or forum. The track or time-coded data file may be manually created, for example, by scripting, or can be a modification of pre-existing data to create situations to which the engineer should respond or to supply missing or corrected suspected information in determining the cause of an accident or other failure.

The ability to switch back and forth between playback and simulation allows the operator to try different scenarios in analyzing pre-recorded data to determine appropriate corrective procedures, as well as to adjust the variables to determine causes of pre-recorded existing conditions. If it is a pre-recorded actual run of the engineer, it allows him to make different decisions to see what the results are.

An improved simulator of the present disclosure detects an exception and pauses the session and present a multimedia consequence or instructor message to the student. These may be one or more of sound, video, and text. The presentation may include lectures on applicable topics, text that reflects operating rules, and video clips to reinforce an instructor's message. The simulation is stopped on the detection of the except and is not restarted until the consequence has been accomplished. This may be the completion of the message or a required input from the student operator.

Figure 2:
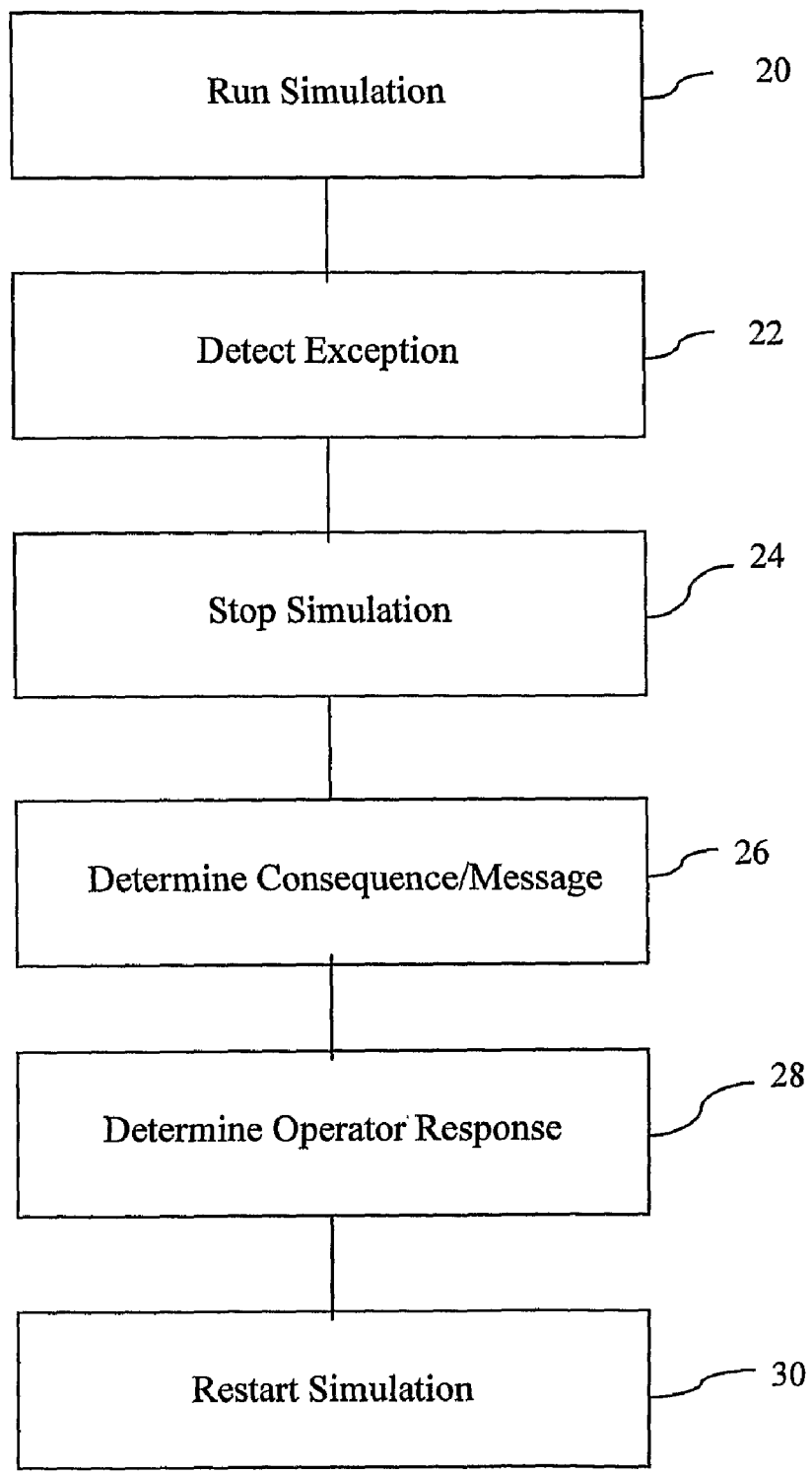
FIG. 2 is a flow chart of method of simulation according to the present disclosure.

As specifically shown in the flow chart of FIG. 2, the simulation begins at 20. An exception occurring during the simulation is detected at 22 and the simulation is stopped at 24. Based on the exception and choices made by the company or the instructor, a consequence and/or message is determined at 26 and communicated by the simulator to the student operator. The simulator determines the operator's response at 28 and if the response is appropriate, the simulation is restarted at 30.

The presentation of the consequence and/or message may also include a test which requires the student operator, acting through the simulator, to demonstrate knowledge or proficiency. The test may take the form of a written test (keyboard-type entry), multiple choice test, a test simulation run, or an audio response. The test simulation run may be of the same run in which the exception occurred or different runs based on the exception and preprogramming by the instructor or the company. Also, when the simulation restarts, it need not restart at the same place it stopped. It may restart at a predetermined spot in the same run or in a different run as a function of preprogramming based on the exception and/or the operators response to the consequence and/or message All interaction with the system is recorded with the electronic record created with the simulation creating a complete, and re-playable file representing the students entire session. The students response may be incorporated into the scoring or grading criteria for the session.

The determination of exception which would trigger a consequence could, for example, be determined using portions of the train handling technique and analysis of U.S. Pat. No. 6,332,106 and the variable exception reporting of U.S. Pat. No. 6,748,303.

The instructor's toolset supplied with the simulator provides the ability to manage a catalog of media content for inclusion across multiple scenarios. Instructor's can then share and reuse the various media to create training scenarios.

Although the present invention has been described and illustrated in detail, it is to be clearly understood that the same is by way of illustration and example only and is not to be taken by way of limitation. The spirit and scope of the present invention are to be limited only by the terms of the appended claims.

What is claimed:

1. A training simulator for training a locomotive operator using at least one training simulation scenario, the simulator comprising:
   a microprocessor;
   a display;
   an input device for providing locomotive operator inputs to the microprocessor;
   a data file of a track;
   a data file of multimedia messages;
   a program for driving the display with the track data during simulation, determining if an exception has occurred during the simulation, wherein the exception is triggered by a trigger associated with the training simulation scenario; and
   providing a multimedia instructional message other than the exception if an exception has occurred,
   wherein the multimedia instructional message includes data associated with an event in a schedule of events that present at least one circumstance or prompt to the locomotive operator based on the trigger associated with the determined exception as well as at least one consequence identified in the multimedia message.

2. The simulator of claim 1, wherein the multimedia instructional message includes one or more of sound, video, and text.

3. The simulator of claim 1, wherein the simulator records all interaction with the simulator with an electronic record created with the simulation creating a complete, and re-playable file representing an operator's entire session.

4. The simulator of claim 1, wherein the program halts the training scenario simulation on the occurrence of the exception and does not restart until the at least one consequence identified in the multimedia instructional message has been completed, and wherein the training scenario simulation restarts at a predetermined spot as a function of preprogramming based on the exception and/or the operators response to the at least one consequence.

5. A training simulator for training a locomotive operator, for training a locomotive operator using at least one training simulation scenario, the simulator comprising:
   a microprocessor;
   a display;
   an input device for providing locomotive operator inputs to the microprocessor;
   a data file of a track;
   a data file of multimedia messages; and
   a program for driving the display with the track data during simulation, determining if an exception has occurred during the simulation, wherein the exception is triggered by a trigger associated with the training simulation scenario; and
   providing a multimedia instructional message other than the exception if an exception has occurred,
   wherein the multimedia instructional message includes one or more of lectures on applicable topics, text that reflects operating rules, and video clips to reinforce an instructor's message and wherein the multimedia instructional message includes data associated with an event in a schedule of events that present at least one circumstance or prompt to the locomotive operator based on the trigger associated with the determined exception as well as at least one consequence identified in the multimedia message.

6. The simulator of claim 5, wherein the program halts the training scenario simulation on the occurrence of the exception and does not restart until the at least one consequence identified in the multimedia instructional message has been completed, and wherein the training scenario simulation restarts at a predetermined spot as a function of preprogramming based on the exception and/or the operators response to the at least one consequence.

7. A training simulator for training a locomotive operator, the simulator comprising:
   a microprocessor;
   a display;
   an input device for providing locomotive operator inputs to the microprocessor;
   a data file of a track;
   a data file of multimedia messages;
   a program for driving the display with the track data during simulation, determining if an exception has occurred during the simulation; and
   providing a multimedia instructional message other than the exception if an exception has occurred, wherein the exception is triggered by a trigger associated with a training simulation scenario,
   wherein the multimedia instructional message includes a test which must be successfully passed before the simulation is resumed and wherein the multimedia instructional message includes data associated with an event in a schedule of events that present at least one circumstance or prompt to the locomotive operator based on the trigger associated with the determined exception as well as at least one consequence identified in the multimedia message.

8. The simulator of claim 7, wherein the test is one of a written test requiring response by keyboard-type entry or audio entry, and a test simulation run.

9. The simulator of claim 7, wherein the test is a test simulation run preselected as a function of the exception.

10. The simulator of claim 7, wherein the program halts the training scenario simulation on the occurrence of the exception and does not restart until the at least one consequence identified in the multimedia instructional message has been completed, and wherein the training scenario simulation restarts at a predetermined spot as a function of preprogramming based on the exception and/or the operators response to the at least one consequence.

11. A training simulator for training a locomotive operator, the simulator comprising:
- a microprocessor;
- a display;
- an input device for providing locomotive operator inputs to the microprocessor;
- a data file of a track;
- a data file of multimedia messages;
- a program for driving the display with the track data during simulation, determining if an exception has occurred during the simulation, wherein the exception is triggered by a trigger associated with a training simulation scenario; and
- providing a multimedia instructional message other than the exception if an exception has occurred,
- wherein the multimedia instructional message includes data associated with an event in a schedule of events that present at least one circumstance or prompt to the locomotive operator based on the trigger associated with the determined exception as well as at least one consequence identified in the multimedia message and wherein the program halts the simulation on the occurrence of the exception and does not restart until the at least one consequence identified in the multimedia instructional message has been completed.

12. The simulator of claim 11, wherein the simulation is restarted at a preselected point in a simulation run that is determined as a function of at least one of the exception and an appropriateness of a locomotive operator response to the multimedia instructional message.

13. A machine readable storage medium storing a program for a simulator, wherein the simulator includes a microprocessor, a display, an input device for providing locomotive operator inputs to the microprocessor, and a data file of a track; the program comprising:
- a data file of multimedia messages; and
- instructions for driving the display with the track data during simulation, determining if an exception has occurred during the simulation, wherein the exception is triggered by a trigger associated with the training simulation scenario;
- and providing a multimedia instructional message other than the exception if an exception has occurred,
- wherein the multimedia instructional message includes data associated with an event in a schedule of events that present at least one circumstance or prompt to the locomotive operator based on the trigger associated with the determined exception as well as at least one consequence identified in the multimedia message.

14. The program of claim 13, wherein the program halts the training scenario simulation on the occurrence of the exception and does not restart until the at least one consequence identified in the multimedia instructional message has been completed, and wherein the training scenario simulation restarts at a predetermined spot as a function of preprogramming based on the exception and/or the operators response to the at least one consequence.

* * * * *